United States Patent
Asanuma

(10) Patent No.: US 11,274,614 B2
(45) Date of Patent: Mar. 15, 2022

(54) EVAPORATED FUEL PROCESSING DEVICE HAVING SELECTIVELY ADJUSTABLE PUMP BODY SPEED BASED ON TEMPERATURE

(71) Applicant: AISAN KOGYO KABUSHIKI KAISHA, Obu (JP)

(72) Inventor: Daisaku Asanuma, Gamagori (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 4 days.

(21) Appl. No.: 16/621,880

(22) PCT Filed: Apr. 25, 2018

(86) PCT No.: PCT/JP2018/016853
§ 371 (c)(1),
(2) Date: Dec. 12, 2019

(87) PCT Pub. No.: WO2018/230169
PCT Pub. Date: Dec. 20, 2018

(65) Prior Publication Data
US 2020/0116091 A1   Apr. 16, 2020

(30) Foreign Application Priority Data
Jun. 14, 2017 (JP) .............................. JP2017-116693

(51) Int. Cl.
*F02D 41/00* (2006.01)
*B60K 15/03* (2006.01)
*F02M 25/08* (2006.01)

(52) U.S. Cl.
CPC ............ *F02D 41/003* (2013.01); *B60K 15/03* (2013.01); *F02M 25/089* (2013.01); *F02M 25/0836* (2013.01); *F02M 2025/0845* (2013.01)

(58) Field of Classification Search
CPC ............ F02D 41/003; F02D 2200/021; F02D 41/004; B60K 15/03; F02M 25/089; F02M 25/0836; F02M 2025/0845; F02M 25/08
See application file for complete search history.

(56) References Cited

U.S. PATENT DOCUMENTS 4,519,755 A * 5/1985 Hanson ................. F04C 23/001
417/32
8,590,514 B2 * 11/2013 Pursifull ............. F02D 41/0007
123/520

(Continued)

FOREIGN PATENT DOCUMENTS

JP   H11-509602 A    8/1999
JP   2004-225594 A   8/2004

(Continued)

OTHER PUBLICATIONS

International Search Report (ISR) for PCT/JP2018/016853 dated May 29, 2018 (5 pages including English Translation).

(Continued)

*Primary Examiner* — David Hamaoui
(74) *Attorney, Agent, or Firm* — Shumaker, Loop & Kendrick, LLP

(57) ABSTRACT

The evaporated fuel processing device may include a pump unit including a pump body configured to pump out evaporated fuel generated in a fuel tank to an intake passage, and a pump controller configured to drive the pump body; and a controller configured to cause the pump controller to control the pump body. When an index related to a temperature of the pump unit exceeds a predetermined range, the controller may restrict the driving of the pump body.

1 Claim, 5 Drawing Sheets

(56) References Cited

U.S. PATENT DOCUMENTS

| | | | |
|---|---|---|---|
| 8,777,585 B2 | 7/2014 | Nakano et al. | |
| 9,689,325 B2* | 6/2017 | Nanba | F02D 41/004 |
| 9,879,623 B2* | 1/2018 | Dekar | F02D 41/0045 |
| 10,704,500 B2* | 7/2020 | Asanuma | F02M 25/08 |
| 2018/0370348 A1* | 12/2018 | Takeuchi | B60K 11/08 |

FOREIGN PATENT DOCUMENTS

| | | |
|---|---|---|
| JP | 2007-170200 A | 7/2007 |
| JP | 2007-196954 A | 8/2007 |
| JP | 2008-240641 A | 10/2008 |
| JP | 2009-138561 A | 6/2009 |
| JP | 2015-116321 A | 6/2015 |
| JP | 2015-200210 A | 11/2015 |
| WO | 2009/066483 A1 | 5/2009 |

OTHER PUBLICATIONS

International Preliminary Report on Patentability (IPER) for PCT/JP2018/016853 dated Aug. 27, 2019 (11 pages including English translation).

* cited by examiner

EVAPORATED FUEL PROCESSING DEVICE HAVING SELECTIVELY ADJUSTABLE PUMP BODY SPEED BASED ON TEMPERATURE

TECHNICAL FIELD

The present specification relates to an evaporated fuel processing device mounted on a vehicle.

BACKGROUND ART

Japanese Patent Application Publication No. 2008-240641 describes an evaporated fuel processing device configured to supply purge gas that contains evaporated fuel to an intake passage connected to an engine. The evaporated fuel processing device supplies the evaporated fuel to the intake passage by using a pump disposed between the intake passage and a fuel tank.

SUMMARY OF INVENTION

Technical Problem

There may be a case where the temperatures in the pump and in a pump controller configured to drive the pump rise depending on a driven state of the pump and/or a surrounding temperature, and the like of the pump. In this case, components of the pump and the pump controller might deteriorate, and durability of the pump and the pump controller might decrease.

The present specification provides a technology that suppresses a temperature rise in a pump and a pump controller configured to drive the pump.

Solution to Technical Problem

The technic disclosed in the specification relates to an evaporated fuel processing device. The evaporated fuel processing device may comprise a pump unit comprising a pump body configured to pump out evaporated fuel generated in a fuel tank to an intake passage, and a pump controller configured to drive the pump body; and a controller configured to cause the pump controller to control the pump body. When an index related to a temperature of the pump unit exceeds a predetermined range, the controller may restrict the driving of the pump body.

This configuration can restrict the driving of the pump body in a situation where the temperature of the pump unit could become high. A temperature rise in the pump unit, which is caused by heat generation in the pump body or the pump controller, can thereby be suppressed.

The index may include at least one of an ambient temperature of the pump unit, a temperature of gas passing through the intake passage and a temperature of cooling water for an engine. This configuration can determine the situation where the temperature of the pump unit could become high, by using the index.

The pump controller may comprise a pump control circuit on which a temperature sensor is mounted. The index may include a temperature sensed by the temperature sensor. This configuration can sense a temperature of the pump controller. This enables appropriate determination on the situation where the temperature of the pump controller could become high.

DESCRIPTION OF EMBODIMENTS

First Embodiment (Configuration of Fuel Supply System)

Figure 1:
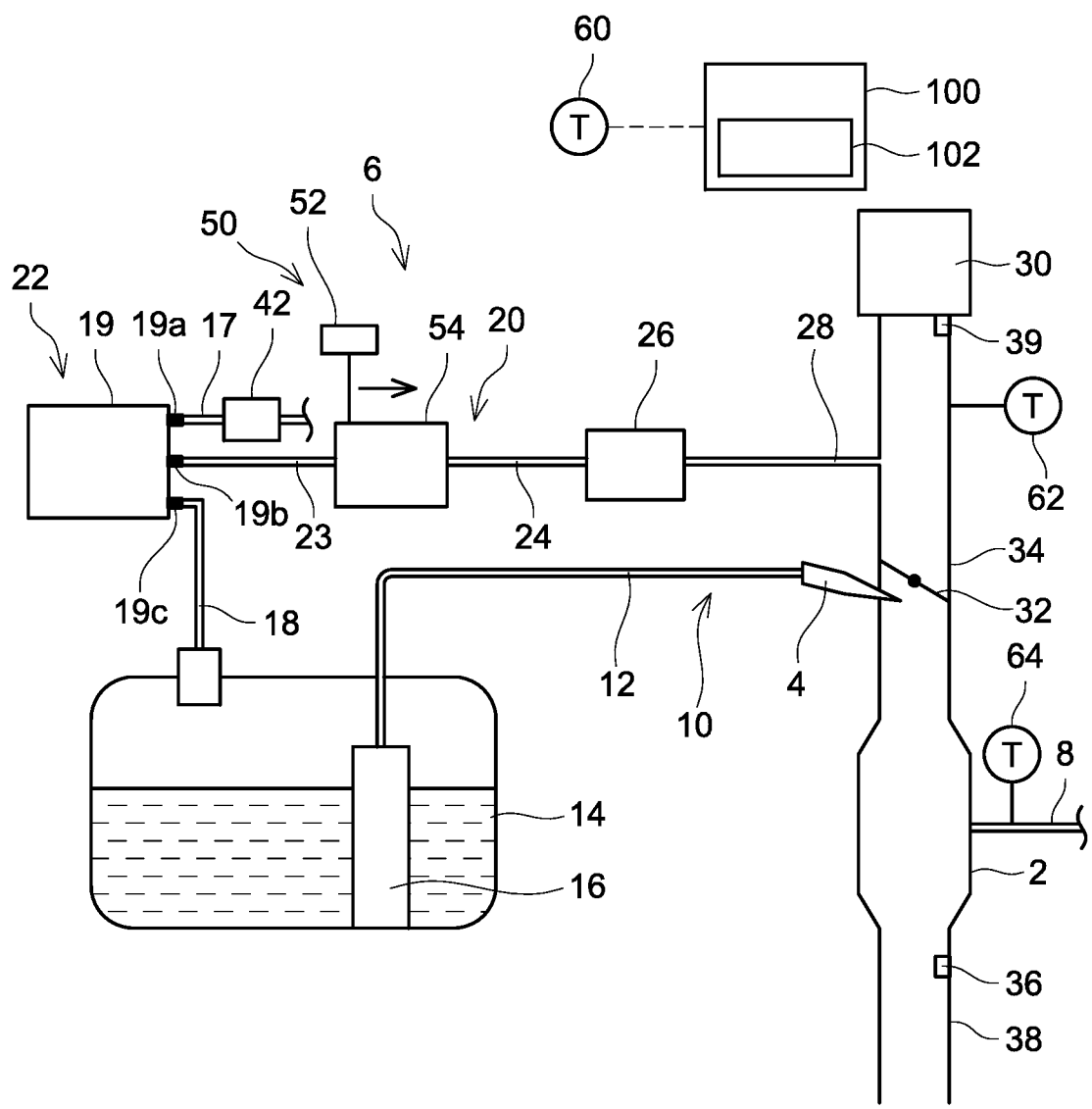
FIG. 1 shows an overview of a fuel supply system of a first embodiment.

With reference to FIG. 1, a fuel supply system 6 that includes an evaporated fuel processing device 20 will be described. The fuel supply system 6 is mounted on a vehicle such as an automobile, and includes a main supply passage 10 for supplying fuel stored in a fuel tank 14 to an engine 2, and an evaporated fuel passage 22 for supplying evaporated fuel generated in the fuel tank 14 to the engine 2.

The main supply passage 10 is provided with a fuel pump unit 16, a supply passage 12, and an injector 4. The fuel pump unit 16 includes a fuel pump, a pressure regulator, a control circuit, and the like. The fuel pump unit 16 controls the fuel pump in accordance with signals transmitted from an ECU 100. The fuel pump boosts a pressure of the fuel in the fuel tank 14 and discharges the boosted fuel. The fuel discharged from the fuel pump has its pressure regulated by the pressure regulator, and is supplied from the fuel pump unit 16 to the supply passage 12. The supply passage 12 is connected to the fuel pump unit 16 and to the injector 4. The fuel supplied to the supply passage 12 passes through the supply passage 12 and reaches the injector 4. The injector 4 includes a valve (not shown) of which aperture is controlled by the ECU 100. When the valve of the injector 4 is opened, the fuel in the supply passage 12 is supplied to an intake passage 34 connected to the engine 2.

The intake passage 34 is connected to an air cleaner 30. The air cleaner 30 includes a filter that removes foreign matter in air flowing into the intake passage 34. A throttle valve 32 is provided in the intake passage 34 between the engine 2 and the air cleaner 30. When the throttle valve 32 opens, air is taken in from the air cleaner 30 toward the engine 2. The throttle valve 32 is a butterfly valve. The ECU 100 adjusts an aperture of the throttle valve 32 to vary an opening area of the intake passage 34 and adjust an amount of air that flows into the engine 2. The throttle valve 32 is provided closer to the air cleaner 30 than the injector 4.

An airflow meter 39 is disposed in the intake passage 34 between the air cleaner 30 and the throttle valve 32. The airflow meter 39 is any of hot-wire, Karman-vortex, or moving-vane airflow meter. The airflow meter 39 is configured to detect an amount of air that is introduced from open air into the intake passage 34 through the air cleaner 30.

Gas left after combustion in the engine 2 passes through an exhaust passage 38, and is released. The exhaust passage 38 has an air-fuel ratio sensor 36 disposed therein. The air-fuel ratio sensor 36 is configured to sense an air-fuel ratio in the exhaust passage 38. When acquiring an air-fuel ratio from the air-fuel ratio sensor 36, the ECU 100 estimates an air-fuel ratio of gas to be supplied to the engine 2.

(Configuration of Evaporated Fuel Processing Device)

The evaporated fuel passage 22 is disposed alongside the main supply passage 10. The evaporated fuel passage 22 is a passage through which the evaporated fuel generated in the fuel tank 14 passes when traveling from the fuel tank 14 to the intake passage 34 through a canister 19. It should be noted that, as mentioned below, the evaporated fuel is mixed with air in the canister 19. A mixture gas obtained by mixing the evaporated fuel and the air in the canister 19 is referred to as purge gas. The evaporated fuel passage 22 is provided with the evaporated fuel processing device 20. The evaporated fuel processing device 20 includes the canister 19, a control valve 26, a pump unit 50, a controller 102 in the ECU 100, and temperature sensors 60, 62, 64.

The fuel tank 14 and the canister 19 are connected by a tank passage 18. The canister 19 is disposed at one end of a purge passage 23 and is connected to a pump body 54 via the purge passage 23. The pump body 54 is connected to the control valve 26 via a purge passage 24. The control valve 26 is connected to the intake passage 34 via a purge passage 28. The purge passages 23, 24 are connected to the intake passage 34 between the airflow meter 39 and the throttle valve 32, via the control valve 26 and the purge passage 28. The canister 19 and the intake passage 34 are thereby coupled via the purge passages 23, 24, 28.

The control valve 26 is disposed between the purge passages 28 and 24. The control valve 26 is a solenoid valve controlled by the controller 102, and is a valve controlled by the controller 102 to switch between an opened state of being opened and a closed state of being closed. The control valve 26 in the closed state blocks communication between the purge passages 28, 24. The control valve 26 in the opened state communicates the purge passages 28, 24 with each other. The controller 102 performs duty control of continuously switching the control valve 26 between the opened state and the closed state in accordance with a duty cycle determined on the basis of the air-fuel ratio and the like. It should be noted that the duty cycle refers to a ratio of a duration of one opened state relative to a total duration of the one opened state and its successive one closed state while the control valve 26 is continuously switched between the closed state and the opened state during the duty control. The control valve 26 adjusts the duty cycle (i.e., a duration of the opened state) to adjust a flow rate of the purge gas to be supplied to the intake passage 34.

The pump unit 50 is disposed between the purge passages 24 and 23. The pump unit 50 is disposed in an engine compartment of the vehicle. The pump unit 50 includes the pump body 54 and a pump control circuit 52. The pump body 54 is a so-called vortex pump (also termed a cascade pump or a Wesco pump), or a so-called turbo pump (an axial-flow pump, a mixed-flow pump or a centrifugal pump). The pump body 54 is controlled by the pump control circuit 52. When the pump body 54 is driven, the purge gas is taken in from the canister 19 into the pump body 54 via the purge passage 23. The purge gas taken into the pump body 54 has its pressure boosted in the pump body 54, and is pumped out to the purge passage 24. The purge gas pumped out to the purge passage 24 passes through the purge passage 24, the control valve 26, and the purge passage 28, and is supplied to the intake passage 34.

The pump control circuit 52 is connected to the controller 102 of the ECU 100. The pump control circuit 52 includes a CPU, a ROM, a RAM, and the like. The pump control circuit 52 controls driving of the pump body 54 in accordance with signals transmitted from the controller 102.

The canister 19 is connected to the pump body 54 via the purge passage 23. The canister 19 includes an open air port 19a, a purge port 19b, and a tank port 19c. The open air port 19a communicates with open air via an open air passage 17 and an air filter 42. There may be a case where the open air passes through the air filter 42 and then flows into the canister 19 from the open air port 19a via the open air passage 17. At this time, the air filter 42 prevents foreign matter in the open air from entering the canister 19.

The purge port 19b is connected to the purge passage 23. The tank port 19c is connected to the fuel tank 14 via the tank passage 18.

The canister 19 accommodates activated carbon (not shown). The evaporated fuel in gas that flows from the fuel tank 14 into the canister 19 through the tank passage 18 and the tank port 19c adheres to the activated carbon. The gas left after the evaporated fuel has adhered passes through the open air port 19a and the open air passage 17, and is released to the open air. The canister 19 can prevent the evaporated fuel in the fuel tank 14 from being released to the open air. The evaporated fuel that adheres to the activated carbon is supplied to the purge passage 23 from the purge port 19b.

The controller 102 is connected to the pump control circuit 52, the control valve 26, and the temperature sensors 60, 62, 64. The controller 102 includes a CPU and a memory such as a ROM or a RAM. The controller 102 performs communication with the pump control circuit 52 to cause the pump control circuit 52 to control the pump body 54. Moreover, the controller 102 controls the control valve 26 to perform a purge process. Furthermore, the controller 102 acquires temperatures sensed by the temperature sensors 60, 62, 64. Line that connect the controller 102 and the respective elements, except for the temperature sensor 60, are omitted. The controller 102 stores a computer program for causing the controller 102 to perform a purge restriction process, which will be described below.

The controller 102 senses an atmospheric temperature outside the vehicle by using the temperature sensor 60. The temperature sensor 60 is disposed, for example, on an outer surface of the vehicle. The controller 102 senses a temperature of gas that passes through the intake passage 34 by using the temperature sensor 62. The temperature sensor 62 is disposed in the intake passage 34. When disposed on an upstream side relative to the purge passage 28, the temperature sensor 62 senses a temperature of air that passes through the intake passage 34. On the other hand, when disposed on a downstream side relative to the purge passage 28, the temperature sensor 62 senses a temperature of a mixture gas of the air that passes through the intake passage 34 and the purge gas. The controller 102 further senses a temperature of cooling water for cooling the engine 2 by using the temperature sensor 64. The temperature sensor 64 is disposed in a cooling water passage 8 through which the cooling water flows.

Next, an operation of the evaporated fuel processing device 20 will be described. When a purge condition is satisfied while the engine 2 is driven, the controller 102 performs duty control on the control valve 26 to perform a purge process of supplying the purge gas to the engine 2. When the purge process is performed, the purge gas is supplied in a direction indicated by an arrow from left to right in FIG. 1. The purge condition is a condition satisfied in a case where the purge process of supplying the purge gas to the engine 2 is to be performed, and is a condition preset in the controller 102 by a manufacturer, on the basis of a temperature of cooling water for the engine 2 and/or a concentration of evaporated fuel in the purge gas (hereinafter referred to as a "purge concentration"). In the present embodiment, it is essential for a purge inhibition flag stored in the controller 102, which will be described below, to be set in off to satisfy the purge condition. In other words, when the purge inhibition flag is set in on, the purge condition is not satisfied. While the engine 2 is driven, the controller 102 constantly monitors whether the purge condition is satisfied. When the purge condition is satisfied, the controller 102 controls the duty ratio of the control valve 26, based on the purge concentration and a measurement value from the airflow meter 39. The purge gas adhering in the canister 19 is thereby introduced into the engine 2.

When performing the purge process, the controller 102 causes the pump control circuit 52 to drive the pump body 54 to supply the purge gas to the intake passage 34. Consequently, the purge gas can be supplied even when the intake passage 34 has a small negative pressure.

It should be noted that the ECU 100 controls the throttle valve 32. Moreover, the ECU 100 also controls an amount of fuel injected by the injector 4. Specifically, the ECU 100 controls the fuel injection amount by controlling an opening time of the valve of the injector 4. When the engine 2 is driven, the ECU 100 calculates a fuel injection time during which the injector 4 injects the fuel to the engine 2 per unit time (i.e., opening time of the valve of the injector 4). The fuel injection time is determined by correcting a reference injection time pre-specified by experiments, so as to maintain the air-fuel ratio at a target air-fuel ratio (e.g., an ideal air-fuel ratio). Moreover, the ECU 100 corrects the fuel injection amount, based on the flow rate of the purge gas and the purge concentration.

Purge Restriction Process

Figure 2:
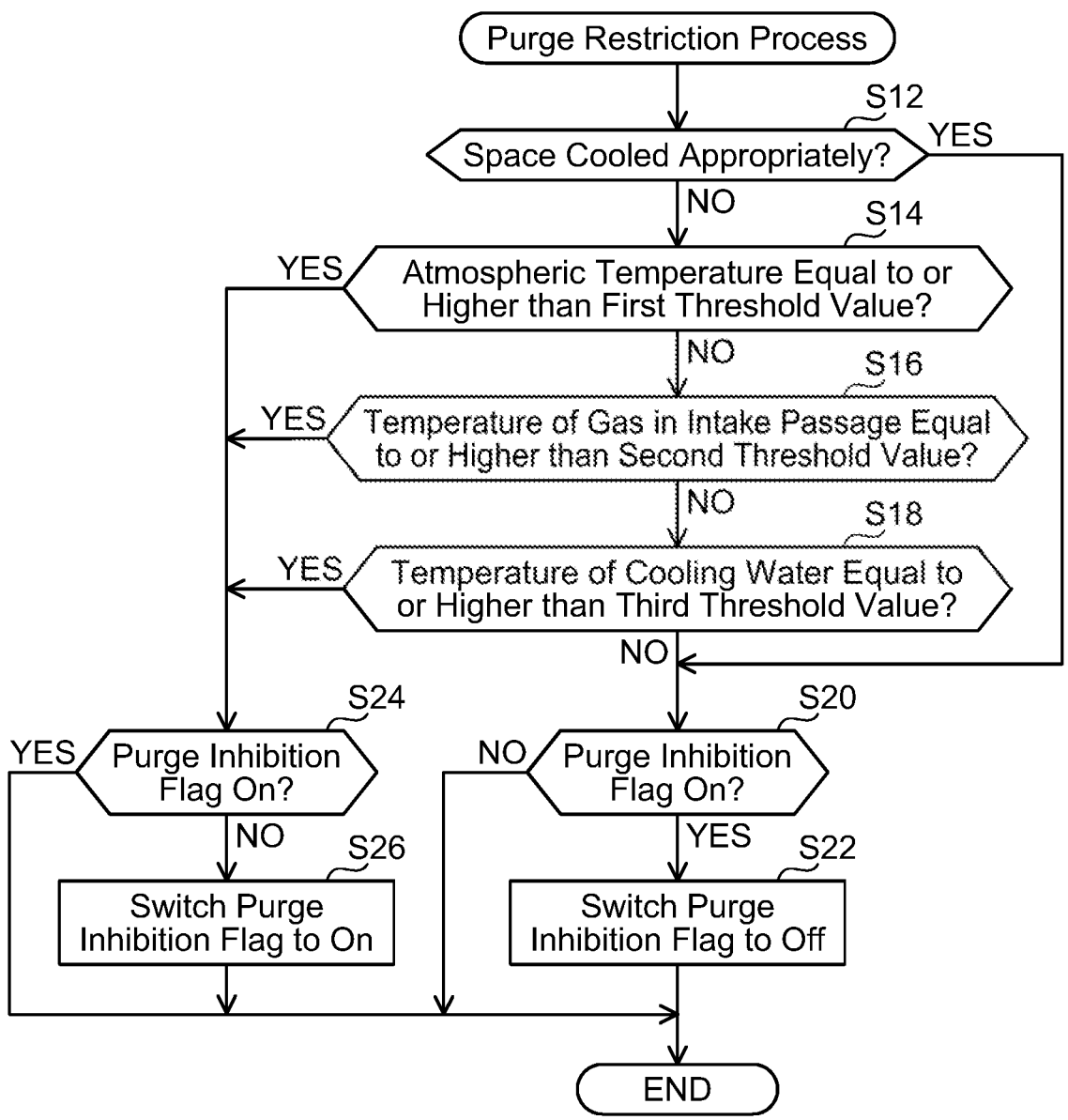
FIG. 2 shows a flowchart of a purge restriction process of the first embodiment.

Next, with reference to FIG. 2, a purge restriction process performed by the controller 102 will be described. The purge restriction process is started when an ignition switch of the vehicle is switched from off to on, and is performed repetitively (e.g., once every 16 ms) while the ignition switch is on. The controller 102 stores the purge inhibition flag used in the purge restriction process. When the ignition switch of the vehicle is switched from off to on, the controller 102 sets the purge inhibition flag to off.

In the purge restriction process, at first in S12, the controller 102 determines whether a space where the pump unit 50 is disposed (i.e., the engine compartment) is in a situation of being cooled appropriately. Specifically, the controller 102 determines whether a speed of the vehicle is not lower than a predetermined speed (e.g., 20 km/hour). When the speed of the vehicle is equal to or higher than the predetermined speed, the controller 102 determines that the space where the pump unit 50 is disposed is in the situation of being cooled appropriately (YES in S12). On the other hand, when the speed of the vehicle is lower than the predetermined speed, the controller 102 determines that the space where the pump unit 50 is disposed is not in the situation of being cooled appropriately (NO in S12).

In a variant, the controller 102 determines whether the space where the pump unit 50 is disposed is in the situation of being cooled appropriately, by determining whether the vehicle runs continuously or intermittently, or not at the predetermined speed or higher. It should be noted that the situation where the vehicle runs intermittently at the predetermined speed or higher includes a situation where the vehicle alternately runs at the predetermined speed or higher and stops, within a predetermined period.

In the case of YES in S12, the process proceeds to S20. On the other hand, in the case of NO in S12, the controller 102 determines in S14 whether an atmospheric temperature outside the vehicle (i.e., an ambient temperature of the pump unit 50) sensed by the temperature sensor 60 is not lower than a first threshold value (e.g., 35° C.). When the sensed atmospheric temperature is equal to or higher than the first threshold value (YES in S14), the process proceeds to S24. On the other hand, when the sensed atmospheric temperature is lower than the first threshold value (NO in S14), the controller 102 determines in S16 whether a temperature of the gas in the intake passage 34 sensed by the temperature sensor 62 is not lower than a second threshold value (e.g., 60° C.). When the sensed temperature of the gas in the intake passage 34 is equal to or higher than the second threshold value (YES in S16), the process proceeds to S24. On the other hand, when the sensed temperature of the gas in the intake passage 34 is lower than the second threshold value (NO in S16), the controller 102 determines in S18 whether a temperature of the cooling water sensed by the temperature sensor 64 is not lower than a third threshold value (e.g., 95° C.). When the sensed temperature of the cooling water is equal to or higher than the third threshold value (YES in S18), the process proceeds to S24. On the other hand, when the sensed temperature of the cooling water is lower than the third threshold value (NO in S18), the process proceeds to S20.

In S20, the controller 102 determines whether the purge inhibition flag stored in the controller 102 is set at on. When the purge inhibition flag is set at on (YES in S20), the controller 102 switches in S22 the purge inhibition flag from on to off, and terminates the purge restriction process. On the other hand, when the purge inhibition flag is set at off (NO in S20), the controller 102 skips S22, and terminates the purge restriction process.

On the other hand, in S24, the controller 102 determines whether the purge inhibition flag stored in the controller 102 is set at on. When the purge inhibition flag is set at off (NO in S24), the controller 102 switches in S26 the purge inhibition flag from off to on, and terminates the purge restriction process. On the other hand, when the purge inhibition flag is set at on (YES in S24), the controller 102 skips S26, and terminates the purge restriction process.

In the purge restriction process, the purge inhibition flag is set to on (S24 and S26) when the space where the pump unit 50 is disposed is not in the situation of being cooled appropriately (NO in S12) and when the atmospheric temperature is equal to or higher than the first threshold value (YES in S14), when the temperature of the gas in the intake passage 34 is equal to or higher than the second threshold value (YES in S16), or when the temperature of the cooling water is equal to or higher than the third threshold value (YES in S18). When this happens, the purge condition is not satisfied, so the purge process is not performed and the driving of the pump body 54 can be inhibited. Consequently, the driving of the pump body 54 can be restricted in the situation where the pump unit 50 is not cooled appropriately, namely, in the situation where the temperature of the pump unit 50 could become high. This can suppress the temperature of the pump unit 50 from becoming high due to heat generation in the pump body 54 and/or the pump control circuit 52.

This configuration can suppress a decrease in durability of the pump unit 50 caused by deterioration of components of the pump control circuit 52 and the pump body 54 caused by a high temperature of the pump unit 50.

Correspondence Relationships

In the present embodiment, the controller 102 is an example of a "controller". Moreover, the speed of the vehicle, the atmospheric temperature outside the vehicle, the temperature of the gas in the intake passage 34, and the temperature of the cooling water are examples of an "index".

Second Embodiment

The evaporated fuel processing device 20 of the present embodiment differs from that of the first embodiment in that the controller 102 performs a pump restriction process in place of the purge restriction process. The controller 102 stores a computer program for causing the controller 102 to perform the pump restriction process. Other configurations of the evaporated fuel processing device 20 are similar to those of the first embodiment, and hence the description thereof will be omitted.

Pump Restriction Process

Figure 3:
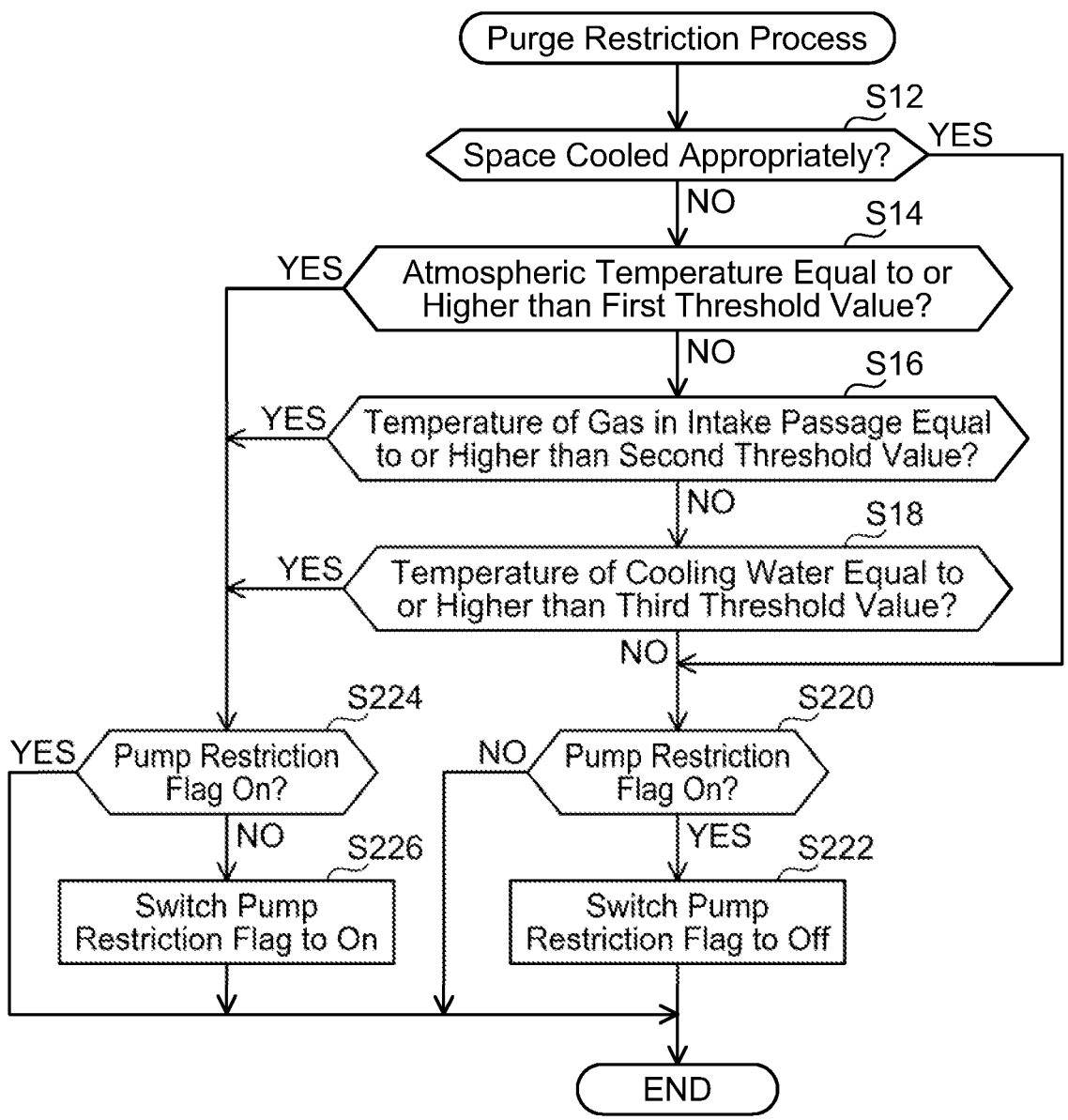
FIG. 3 shows a flowchart of a pump restriction process of a second embodiment.

With reference to FIG. 3, the pump restriction process performed by the controller 102 will be described. The pump restriction process is performed at a timing similar to that of the purge restriction process. The controller 102 stores a pump restriction flag used in the pump restriction process. When the ignition switch of the vehicle is switched from off to on, the controller 102 sets the pump restriction flag to off.

In the pump restriction process, the processes of S12 to S18 are performed as in the purge restriction process of the first embodiment. In the case of YES in S12 or NO in S18, the process proceeds to S220. In S220, the controller 102 determines whether the pump restriction flag is on. When the pump restriction flag is set at on (YES in S220), the controller 102 switches in S222 the pump restriction flag from on to off, and terminates the pump restriction process. On the other hand, when the pump restriction flag is set at off (NO in S220), the controller 102 skips S222, and terminates the pump restriction process.

On the other hand, in the case of YES in any of S14, S16, and S18, the process proceeds to S224. In S224, the controller 102 determines whether the pump restriction flag is set at on. When the pump restriction flag is set at off (NO in S224), the controller 102 switches in S226 the pump restriction flag from off to on, and terminates the pump restriction process. On the other hand, when the pump restriction flag is set at on (YES in S224), the controller 102 skips S226, and terminates the pump restriction process.

When the pump restriction flag is set at on, the controller 102 restricts the driving of the pump body 54. For example, when a maximum rotational speed at which the pump body 54 can be driven is 50000 rpm and the pump restriction flag is set at off, the controller 102 transmits to the pump control circuit 52 a signal for driving the pump body 54 at a rotational speed in a range of 50000 rpm or lower, in accordance with the purge concentration, an air intake amount, and the like. On the other hand, when the pump restriction flag is set at on, the controller 102 transmits to the pump control circuit 52 a signal for driving the pump body 54 at a rotational speed in a range that is not higher than a restricted rotational speed (e.g., 20000 rpm) that is lower than 50000 rpm, in accordance with the purge concentration, an air intake amount, and the like. According to this configuration, the pump body 54 can be driven at the restricted rotational speed when the pump restriction flag is set at on, in a situation where the pump body 54 is to be driven at the restricted rotational speed or higher when the pump restriction flag is set in off. The driving of the pump body 54 can thereby be restricted. Consequently, the driving of the pump body 54 can be restricted in the situation where the pump unit 50 is not cooled appropriately, namely, in the situation where the temperature of the pump unit 50 could become high. This can suppress a temperature of the pump unit 50 from becoming high due to heat generation in the pump body 54 and/or the pump control circuit 52.

It should be noted that a method of restricting the driving of the pump body 54 may include, for example, restricting a maximum current value of the pump body 54 to a restricted current value (e.g., when the maximum current value is 10 amperes, the restricted current value is 2 amperes), or restricting a flow rate of the purge gas pumped out from the pump body 54 from a maximum flow rate (e.g., 50 liters/minute) to a restricted flow rate (e.g., 20 liters/minute), other than restricting the rotational speed.

The controller 102 regularly checks whether the pump restriction flag is set at on at the timing of starting the purge process and during the purge process. In the case where the pump restriction flag is switched from off to on during the purge process, if a rotational speed of the pump body 54 at present exceeds the restricted rotational speed, the controller 102 transmits a signal for driving the pump body 54 at the restricted rotational speed to the pump control circuit 52. On the other hand, if the rotational speed of the pump body 54 at present does not exceed the restricted rotational speed, the controller 102 does not transmit the signal for driving the pump body 54 at the restricted rotational speed to the pump control circuit 52. The driving of the pump body 54 can thereby be restricted appropriately.

Third Embodiment

Figure 4:
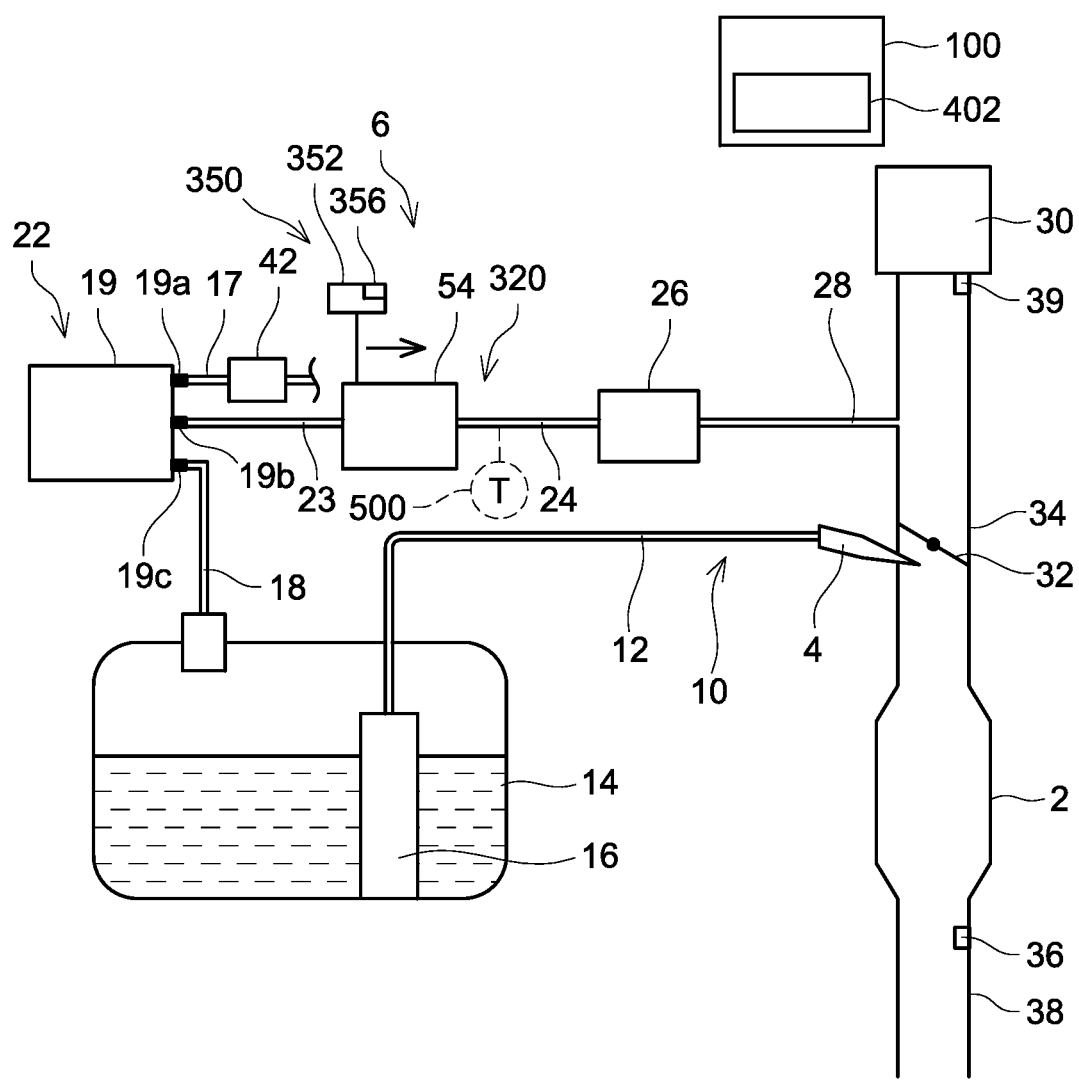
FIG. 4 shows an overview of a fuel supply system of a third embodiment.

Regarding an evaporated fuel processing device 320 of the present embodiment, its differences from the evaporated fuel processing device 20 of the first embodiment will be described. It should be noted that among configurations of the evaporated fuel processing device 320, the configurations identical with those of the evaporated fuel processing device 20 are given the reference signs identical with those of the evaporated fuel processing device 20, and description thereof will be omitted. As shown in FIG. 4, a pump unit 350 of the evaporated fuel processing device 320 includes a pump control circuit 352 in place of the pump control circuit 52. The pump control circuit 352 includes a temperature sensor 356, in addition to the configuration of the pump control circuit 52. The temperature sensor 356 is mounted on the pump control circuit 352, and is configured to sense a temperature of the pump control circuit 352.

The evaporated fuel processing device 320 includes a controller 402 in place of the controller 102. The controller 402 is configured to receive the temperature of the pump control circuit 352 sensed by the temperature sensor 356, from the pump control circuit 352.

It should be noted that the evaporated fuel processing device 320 does not include the temperature sensors 60, 62, 64. Moreover, a temperature sensor 500 indicated by a dashed line in FIG. 4 is disposed in the evaporated fuel processing device 320 of a variant, which will be described below, and may not be included in the present embodiment.

Purge Restriction Process

Figure 5:
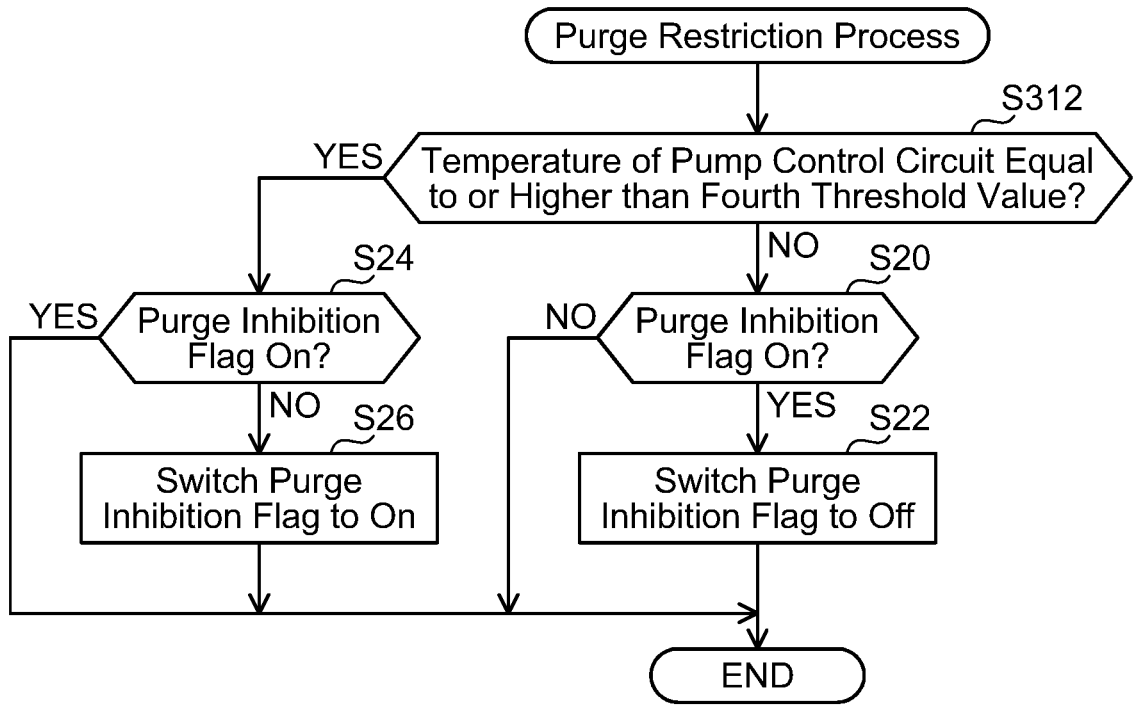
FIG. 5 shows a flowchart of a purge restriction process of the third embodiment.

With reference to FIG. 5, a purge restriction process performed by the controller 402 will be described. As in the first embodiment, the purge restriction process is started when the ignition switch of the vehicle is switched from off to on, and is repetitively performed while the ignition switch is on. Moreover, the controller 402 stores a purge inhibition flag used in the purge restriction process, similar to the controller 102. It should be noted that other configurations of the controller 402 are similar to those of the controller 102.

In the purge restriction process, at first in S312, the controller 402 acquires the temperature of the pump control circuit 352 sensed by the temperature sensor 356, and determines whether the temperature of the pump control circuit 352 is not lower than a fourth threshold value (e.g., 120° C.). When the temperature of the pump control circuit 352 is equal to or higher than the fourth threshold value (YES in S312), the process proceeds to S24. On the other hand, when the temperature of the pump control circuit 352 is lower than the fourth threshold value (NO in S312), the process proceeds to S20.

In the purge restriction process, when the temperature of the pump control circuit 352 is equal to or higher than the fourth threshold value (YES in S312), the purge inhibition flag is set to on (S24 and S26). Due to this, the purge condition is not satisfied, and the purge process is not performed. The driving of the pump body 54 can thereby be inhibited. Consequently, the driving of the pump body 54 can be restricted in the situation where the temperature of the pump unit 350 could become high. This can suppress the temperature of the pump unit 350 from becoming high due to heat generation in the pump body 54 and/or the pump control circuit 352.

Correspondence Relationship

The temperature of the pump control circuit 352 is an example of the "index".

Fourth Embodiment

The evaporated fuel processing device 320 of the present embodiment differs from that of the third embodiment in that the controller 402 performs a pump restriction process in place of the purge restriction process. The controller 402 stores a computer program for causing the controller 402 to perform the pump restriction process. Other configurations of the evaporated fuel processing device 320 are similar to those of the third embodiment, and hence description thereof will be omitted.

Pump Restriction Process

Figure 6:
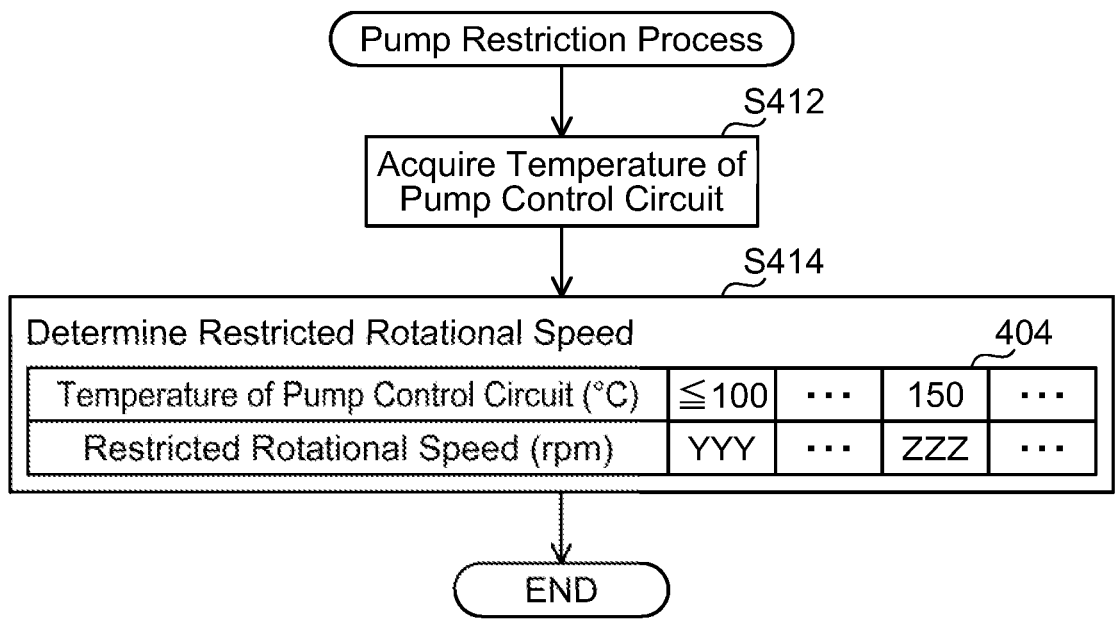
FIG. 6 shows a flowchart of a pump restriction process of a fourth embodiment.

With reference to FIG. 6, the pump restriction process performed by the controller 402 will be described. The pump restriction process is performed at a timing similar to that of the purge restriction process of the third embodiment.

In the pump restriction process, at first in S412, the temperature of the pump control circuit 352 is acquired. Next, in S414, the controller 402 uses the temperature of the pump control circuit 352 acquired in S412 and a data map 404 to determine a restricted rotational speed of the pump body 54, and terminates the pump restriction process.

The data map 404 is stored in advance in the controller 402. The data map 404 records temperatures of the pump control circuit 352 and restricted rotational speeds of the pump body 54 in association with each other. It should be noted that each of "YYY", "ZZZ", and the like shown in the data map 404 indicates a numerical value. The "YYY" may indicate, for example, the maximum rotational speed at which the pump body 54 can be driven. The data map 404 is created by pre-specifying a rotational speed of the pump body 54 that causes no temperature rise in the pump body 54 for each of a plurality of temperatures of the pump control circuit 352 in experiments. It should be noted that, a higher temperature of the pump control circuit 352 corresponds to a lower restricted rotational speed.

In the pump restriction process, the temperature of the pump control circuit 352 is used for the determination on whether the temperature of the pump unit 350 could become high. The controller 402 uses the restricted rotational speed determined in S414 to control the rotational speed of the pump body 54. Specifically, when the maximum rotational speed of the pump body 54 is 50000 rpm and the restricted rotational speed is 20000 rpm, for example, the controller 402 transmits a signal for driving the pump body 54 at a rotational speed in a range of the restricted rotational speed (i.e., 20000 rpm) or lower to the pump control circuit 352. According to this configuration, the pump body 54 can be driven at the restricted rotational speed, while the pump body 54 is to be driven at a rotational speed of 50000 rpm when the rotational speed is not restricted by the restricted rotational speed. The driving of the pump body 54 can thereby be restricted. Consequently, the driving of the pump body 54 can be restricted in the situation where the pump unit 350 is not cooled appropriately, namely, in the situation where the temperature of the pump unit 350 could become high. This can suppress the temperature of the pump unit 350 from becoming high due to heat generation in the pump body 54 and/or the pump control circuit 352.

In addition, as in the second embodiment, a method of restricting the driving of the pump body 54 may include, for example, restricting the current value of the pump body 54 or the flow rate of the purge gas pumped out from the pump body 54, other than restricting the rotational speed.

As in the second embodiment, the controller 402 regularly checks the restricted rotational speed at the timing of starting the purge process and during the purge process to restrict the driving of the pump body 54.

While specific examples of the present disclosure have been described above in detail, these examples are merely illustrative and place no limitation on the scope of the patent claims. The technology described in the patent claims also encompasses various changes and modifications to the specific examples described above.

(1) In the above-described first and third embodiments, the purge restriction process inhibits the purge process to restrict the driving of the pump body 54. However, the purge process need not be inhibited. In this case, the controllers 102, 402 may store a pump inhibition flag in place of the purge inhibition flag. Settings for on and off of the pump inhibition flag may be similar to those of the purge inhibition flag. The pump inhibition flag is not necessarily off for the purge condition to be satisfied. In other words, the purge condition may be satisfied when the pump inhibition flag is set at on. When performing the purge process while the pump inhibition flag is set at on, the controllers 102, 402 may perform the purge process without driving the pump body 54.

(2) In the purge restriction process of the first embodiment and the pump restriction process of the second embodiment described above, not all of the processes of S12 to S18 need be performed. For example, at least one of the processes of S12 to S18 may be performed.

(3) The evaporated fuel processing device 20 of the first or second embodiment may include the temperature sensor 356 of the third embodiment. In this case, the controller 102 of the first or second embodiment may perform either of the purge restriction process in FIG. 5 or the pump restriction process in FIG. 6, in addition to the purge restriction process in FIG. 2 or the pump restriction process in FIG. 3. Further, the controller 102 of the first embodiment may additionally perform the process of S312 after any of the process of S12 to S20 in the purge restriction process.

(4) The controller 102 may be disposed separately from the ECU 100.

(5) The intake passage 34 may have a supercharger disposed therein. In this case, the purge passage 28 may be connected to at least one of the intake passage 34 on an upstream side relative to the super charger and the intake passage 34 on a downstream side relative to the supercharger.

(6) In the present embodiments, the pump body 54 is disposed between the purge passages 23 and 24. However, the position of the pump body 54 is not limited thereto, and the pump body 54 may be disposed, for example, at the open air passage 17.

(7) In the above-described embodiments, the purge passage 28 is connected to the intake passage 34 between the airflow meter 39 and the throttle valve 32. However, the purge passage 28 may be connected to the intake passage 34 between the throttle valve 32 and the engine 2.

(8) In the second embodiment, when the pump restriction flag is set at on, the pump body 54 is driven at a rotational speed that is equal to or lower than the fixed restricted rotational speed. However, the restricted rotational speed may not be fixed. For example, as in the fourth embodiment, a plurality of restricted rotational speeds may be set depending on the atmospheric temperature outside the vehicle, the temperature of the gas in the intake passage 34, the temperature of the cooling water, and the traveling state of the vehicle. In this case, the controller 102 may store one or more data maps that record restricted rotational speeds each corresponding to an atmospheric temperature outside the vehicle, a temperature of the gas in the intake passage 34, a temperature of the cooling water, and a traveling state of the vehicle.

(9) In the third and fourth embodiments, the temperature sensed by the temperature sensor 356 of the pump control circuit 352 is used to restrict the driving of the pump body 54. However, as shown in FIG. 4, the temperature sensor 500 may be disposed at the purge passage 24 on a downstream side relative to the pump body 54, in addition to or in place of the temperature sensor 356. The controller 402 may use the temperature sensed by the temperature sensor 500 to restrict the driving of the pump body 54, as in FIGS. 5 and 6. In the present variant, the temperature sensed by the temperature sensor 500, namely, the temperature of the gas pumped out from the pump body 54 is an example of the "index".

Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

The invention claimed is:

1. An evaporated fuel processing device comprising:
a pump unit comprising a pump body configured to pump out evaporated fuel generated in a fuel tank to an intake passage, and a pump controller configured to drive the pump body; and
a controller configured to cause the pump controller to control the pump body,
wherein
when a speed of a vehicle on which the pump unit is mounted is lower than a predetermined speed, and when an ambient temperature of the pump unit or a temperature of gas passing through the intake passage exceeds a predetermined range, the controller reduces a rotational speed of the pump body as compared to a state where the ambient temperature of the pump unit or the temperature of gas passing through the intake passage does not exceed the predetermined range and the vehicle does not exceed the predetermined speed and
when the speed of the vehicle is higher than or equal to the predetermined speed, even when the ambient temperature of the pump unit or the temperature of the gas passing through the intake passage exceeds the predetermined range the controller does not reduce the rotational speed of the pump body.

* * * * *